May 24, 1949.  F. TURRETTINI  2,471,050
DEVICE FOR THE MEASUREMENT OF LENGTHS
Filed Dec. 18, 1947
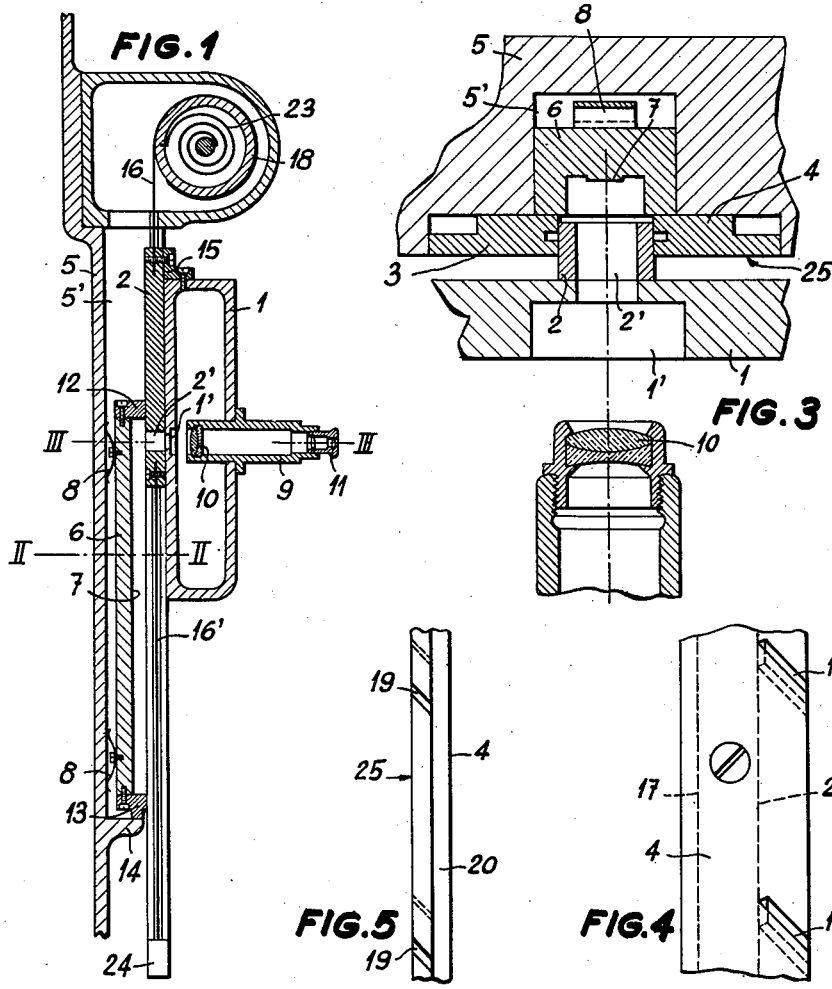

Patented May 24, 1949

2,471,050

UNITED STATES PATENT OFFICE 2,471,050

DEVICE FOR THE MEASUREMENT OF LENGTHS

Fernand Turrettini, Bellevue-Geneva, Switzerland, assignor to Societe Genevoise d'Instruments de Physique, Geneva, Switzerland, a Swiss firm Application December 18, 1947, Serial No. 792,432
In Switzerland July 9, 1942

Section 1, Public Law 690, August 8, 1946
Patent expires July 9, 1962

2 Claims. (Cl. 33—1)

The present invention relates to devices for the measurement of lengths for use in measuring instruments or machines or in precision machine tools, and more particularly to devices of this kind which comprise a stationary graduation observable by means of an optical device carried by a slide shiftable in front of the graduation.

Devices for the measurement of lengths are already known in which a graduated scale is shiftable in front of a stationary optical observation device; in some devices of this kind, to protect the scale against dirt, this scale is located on the inner face of the bottom wall of a trough-shaped piece, the rims of which bear against a guiding surface provided with an observation aperture and form a sealing joint therewith. In the devices, however, which comprise a stationary graduated scale and an optical observation device shiftable in front thereof, the problem of the protection of the scale is more difficult to solve, especially when the slide carrying the optical system is shorter than the scale, because of this slide not having a bearing surface long enough to form a sealing joint with the scale on the whole length thereof, whatever may be the position of the slide.

It is an object of the invention to provide novel, simple and reliable means for efficiently protecting the scale against dirt in the last mentioned kind of measuring device.

According to certain features of the present invention, the stationary scale is located on the inner face of the bottom wall of a trough-shaped piece mounted in a recess of the instrument or machine frame, which recess is provided with an elongated aperture in front of which the slide carrying the optical device is shiftable. This elongated aperture is limited by two longitudinal flanges on which bear the long sides of the trough-shaped piece and the slide is provided with a cover plate engaged between said longitudinal flanges and carrying at each extremity flexible bands the rims of which engage in longitudinal grooves provided in the adjacent faces of the flanges.

In the drawing, I have shown an illustrative embodiment of the measuring device in accordance with the present invention.

Fig. 1 is an elevational sectional view thereof.

Fig. 2 is an enlarged cross section taken along the line II—II of Figure 1.

Fig. 3 is an enlarged cross section taken along the line III—III of Fig. 1, and

Fig. 4 is an enlarged plan view of a detail.

Fig. 5 is an enlarged side view of said detail.

Referring now to the drawing, 5 indicates the frame of an instrument or machine, in which is provided an elongated vertical recess 5' of substantially rectangular cross section. This recess communicates with the outside by an elongated aperture 5" limited by two longitudinal flanges 3 and 4 secured to the frame by means of screws.

Within the recess 5' there is fitted a piece 6 of U-shaped cross section, closed at its upper and lower extremities by two plates 12 and 13 screwed thereto so as to constitute a trough, the inside of which is directed towards the aperture 5". The bottom wall of this trough-shaped piece 6 is provided on its inner surface with a graduated scale 7. The piece 6 bears by its longitudinal walls 6' on the flanges 3 and 4 and is held against these flanges by means of springs 8 bearing against the bottom of the recess 5'; the piece 6 bears by its own weight through the medium of a projection of the end plate 13 against a shoulder 14 of the frame whereby it is held stationary in the recess 5'.

9 is a microscope for observation of the graduated scale 7, and 10 is the objective and 11 the eye-piece of this microscope which is mounted in a slide 1 shiftable along the aperture 5" of the recess on guideways 21 and 22 with which is provided the frame 5; on the slide 1 is fixed, by means of a corner iron 15, a cover plate 2 of general rectangular shape which engages without clearance between the longitudinal flanges 3 and 4 limiting the aperture 5". The cover plate 2 and the bottom wall of the slide 1 are provided with an aperture 2', 1' respectively, allowing observation of the scale 7 by means of the microscope 9. At each extremity of the cover plate 2, there is attached a flexible band 16, 16' respectively, intended to constitute a cover for the aperture 5. The rims of said bands engage in longitudinal grooves 17, 17' respectively, provided in the adjacent inner faces of the flanges 3 and 4. The band 16 is wound about a drum 18 containing a spiral spring 23, which tends to urge the drum in rotation in one direction, thus stretching the band 16. The band 16' hangs loose and is ballasted by a counterweight 24.

In the construction shown in the drawing, where the slide is shiftable vertically, it will be convenient to prevent particles of lubricant coming from the guideways 21 and 22, from soiling the scale by passing through the clearance which unavoidably subsists between the edges of the bands 16 and 16' and the bottom of the grooves 17 and 17'. This result will be attained by providing the flanges 3 and 4 with oblique slots 19 intended to direct the lubricant into the vertical oil collector 20 shown in Figs. 4 and 5 which are a plane and a side view, respectively, of the flange 4. Fig. 4 shows that the slope of the slots 19 in the flange 4 is so directed that the particles of lubricant are going from the left to the right in the figure; Fig. 5 shows that said slope is also so directed, that the particles of lubricant are going from the outer face designed by 25 of the flange 4 into the collector 20.

What I claim is:

1. A device for the measurement of lengths comprising in combination with the frame of an instrument or machine, a recess in said frame having an elongated aperture, two longitudinal flanges secured to said frame and limiting said elongated aperture, a trough-shaped piece mounted in said recess and resting by its long sides on said flanges, a graduated scale on the inner bottom surface of said trough-shaped piece, a slide shiftable along said elongated aperture, an optical device for observation of said scale mounted in said slide, a cover plate secured to said slide and engaging between the inner faces of said flanges, a flexible band attached at each extremity of said cover plate and having its edges engaging in longitudinal grooves provided in the inner faces of said flanges, means for holding said flexible bands in stretched conditions, whereby to protect said graduated scale against entrance of dirt.

2. A device for the measurement of lengths comprising in combination with the frame of an instrument or machine, a recess in said frame having an elongated aperture extending in a substantially vertical plane, two longitudinal flanges secured to said frame and limiting said vertical aperture, a trough-shaped piece mounted in said recess and bearing by its long sides on said flanges, a graduated scale on the vertical inner bottom wall of said trough-shaped piece, a slide shiftable along said elongated vertical aperture, an optical device for observation of said scale mounted in said slide, a cover plate secured to said slide and engaging between the inner faces of said flanges, a flexible band attached at each extremity of said cover plate and having its edges engaging in longitudinal grooves provided in the inner faces of said flanges, means for holding said flexible bands in stretched condition, whereby to protect said graduated scale against entrance of dirt; said flanges each having one of their faces longitudinally recessed to form an oil collector and provided with oblique slots merging into said oil collector, whereby to evacuate therethrough the lubricant which would tend to penetrate into the recess containing the graduated scale.

FERNAND TURRETTINI.

REFERENCES CITED

The following references are of record in the file of this patent:

UNITED STATES PATENTS

| Number | Name | Date |
| --- | --- | --- |
| 2,068,199 | Seletsky | Jan. 19, 1937 |
| 2,293,733 | Guttmann | Aug. 25, 1942 |
| 2,322,972 | Rumpf | June 29, 1943 |